Figure 1:
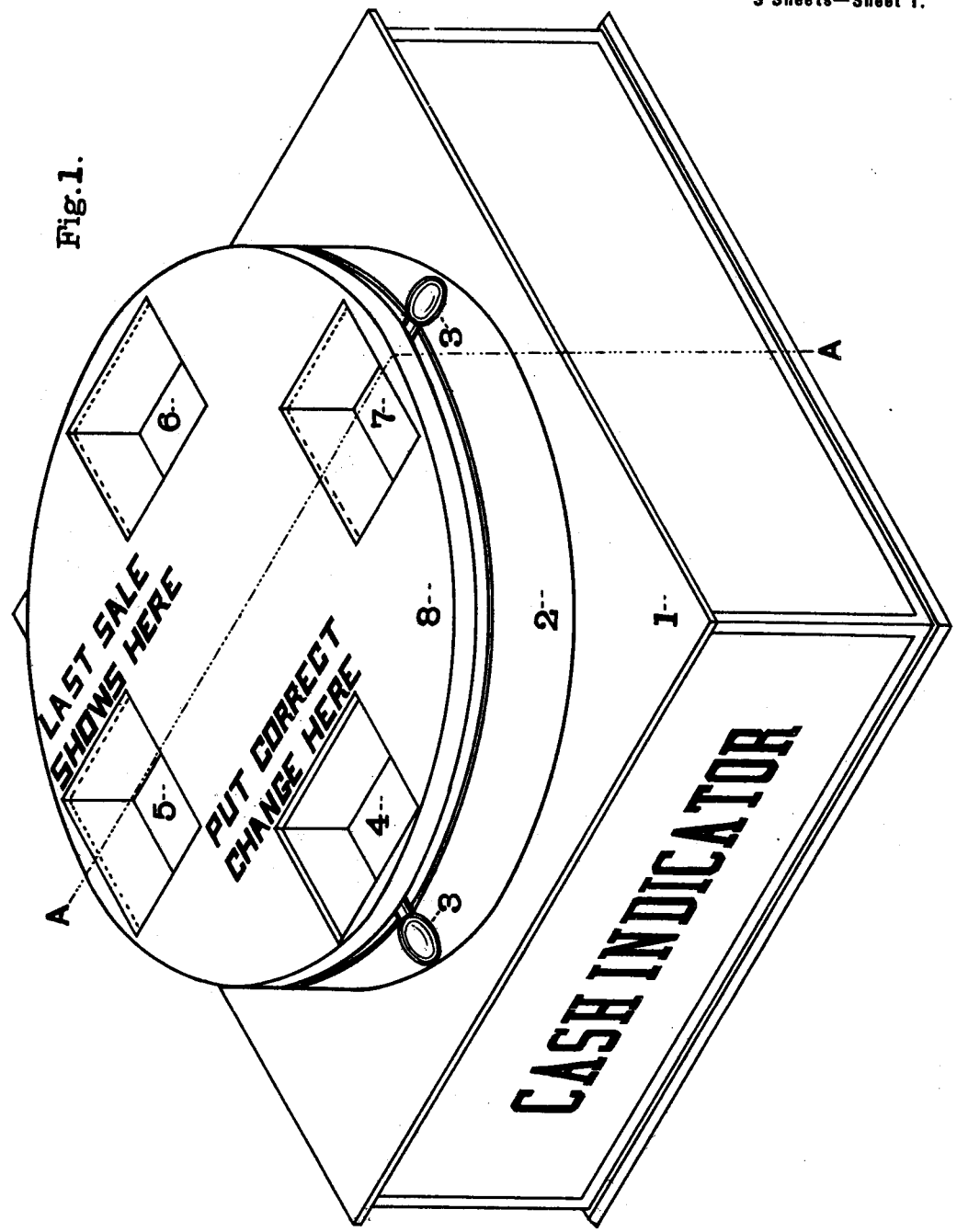

No. 675,984. Patented June 11, 1901.
J. H. SNOW.
CASH INDICATOR.
(Application filed June 6, 1900.)
(No Model.) 3 Sheets—Sheet 1.

WITNESSES: INVENTOR
Jesse D. Hamrick Jacob H. Snow
L. E. Snow.

No. 675,984.  
J. H. SNOW.  
CASH INDICATOR.  
(Application filed June 6, 1900.)  
(No Model.)
Patented June 11, 1901.
3 Sheets—Sheet 2.
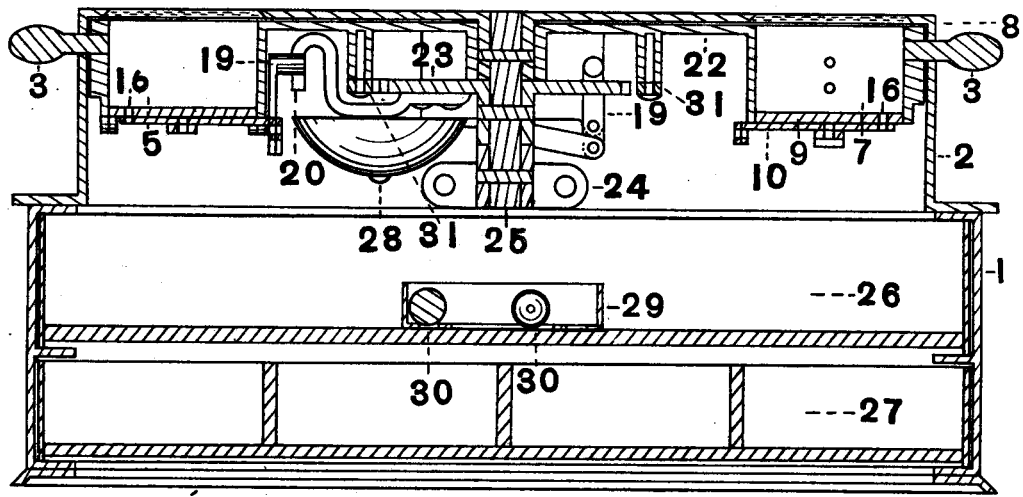
Fig.2.
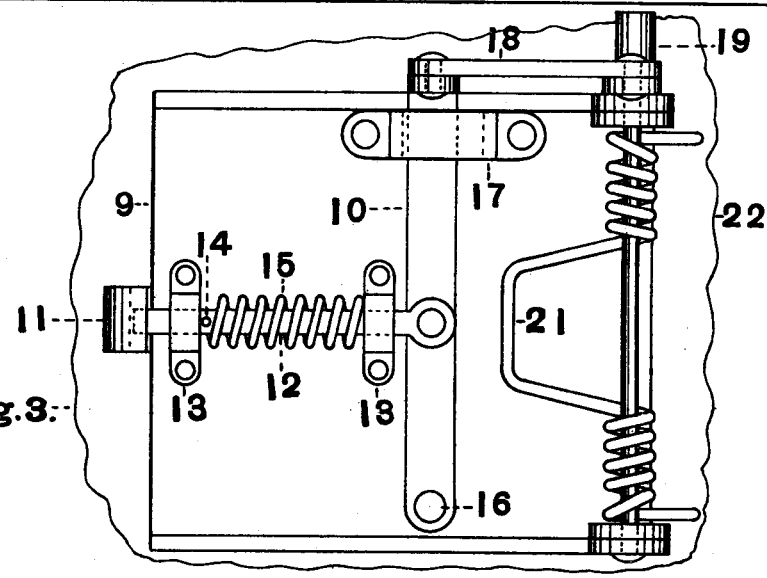
Fig.3.
Fig.4.
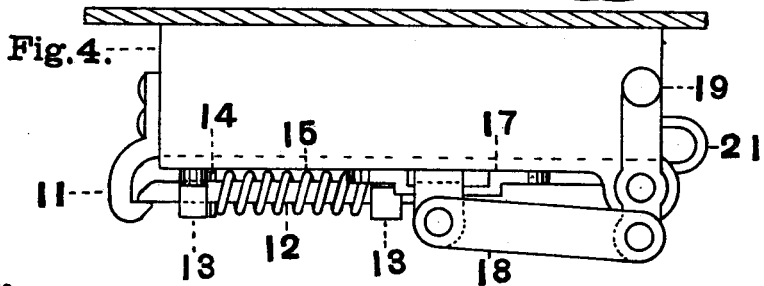
WITNESSES:
Jess D. Hamrick
L. E. Snow.
INVENTOR
Jacob H. Snow.

No. 675,984. Patented June 11, 1901.
J. H. SNOW.
CASH INDICATOR.
(Application filed June 6, 1900.)
(No Model.) 3 Sheets—Sheet 3.

WITNESSES: INVENTOR
Jesse D. Hamrick Jacob H. Snow
L. E. Snow

UNITED STATES PATENT OFFICE.

JACOB H. SNOW, OF INDIANAPOLIS, INDIANA.

CASH-INDICATOR.

SPECIFICATION forming part of Letters Patent No. 675,984, dated June 11, 1901.

Application filed June 6, 1900. Serial No. 19,292. (No model.)

*To all whom it may concern:*

Be it known that I, JACOB H. SNOW, a citizen of the United States, residing at Indianapolis, in the county of Marion and State of Indiana, have invented a certain new and useful Improvement in Cash Indicating and Depositing Machines, of which the following is a description, reference being had to the accompanying drawings, forming part of this specification.

My invention relates to a cash indicator and depositor using the money to indicate the amount of the purchases and depositing the said money in a cash-drawer beyond the reach of the purchaser and clerk operating the same, and having a special cash-drawer for holding the money received and a cash-drawer for holding the change used by the clerk, and being so arranged that two or more of the last sales will be indicated at all times and the opening and closing of the cash-drawer for the purpose of making change will not destroy or obliterate said indications, and having an indicator in said cash-drawer non-accessible to the operator or clerk which will show that the operator or clerk has been trying to "beat" the machine or steal from the employer should an attempt of the kind be made.

My invention relates to that class of machines which employ a plurality of indicators for the purpose of making and preserving separate registrations of different classes of sales, or of sales from different departments of a store, or of sales by different clerks in the store, or by showing the names and amounts of different parties who have made purchases or paid money on account, whereby at the end of a day's business the proprietor may ascertain the amount of transactions of each class, or the amount of sales from each of the several departments of the store, or the amount of sales made by the respective clerks in the store, and the amount and name of each purchaser or party paying on account.

My invention has for its object the production of a simple and perfect cash indicator and depositor that cannot be tampered with or beaten by the parties operating same. It is a well-known fact that all the so-called "cash registers and indicators" now on the market can be beaten by the clerks or parties operating same, because the cash paid by the purchaser is at all times within the reach of the clerk, who can at any time tamper with or beat the register and take the cash. My invention has for its main object the placing of the cash received from sales or on account out of the reach of the clerk or operator, so it is impossible for the clerk or operator to get hold of the cash or beat either the machine or proprietor out of any money paid by the customer, and to furnish a record or separate each sale, if so desired, and show the time of the sale and the name of the clerk making the sale or receiving the money, as the case may be.

The novelty of my invention consists in the showing of the money to indicate the amount of the purchase, the indicating of two or more of the last sales, the depositing of the money after the said indications are made where the operator or clerk cannot get hold of same, and an indicator to show in case the operator or clerk should attempt to beat the machine, all of which will be hereinafter more fully described, and particularly pointed out in the claims.

Figure 5:
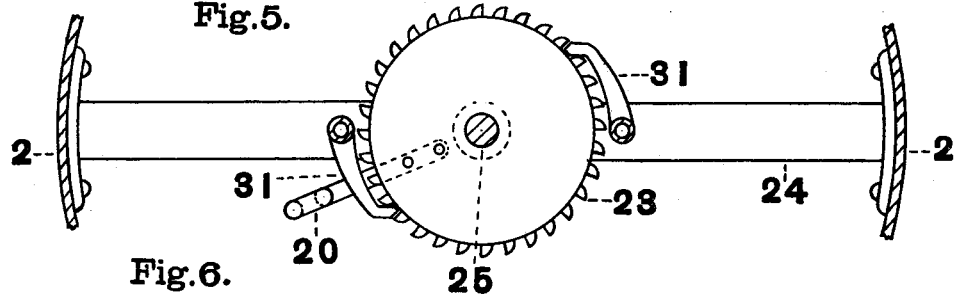
Figure 6:
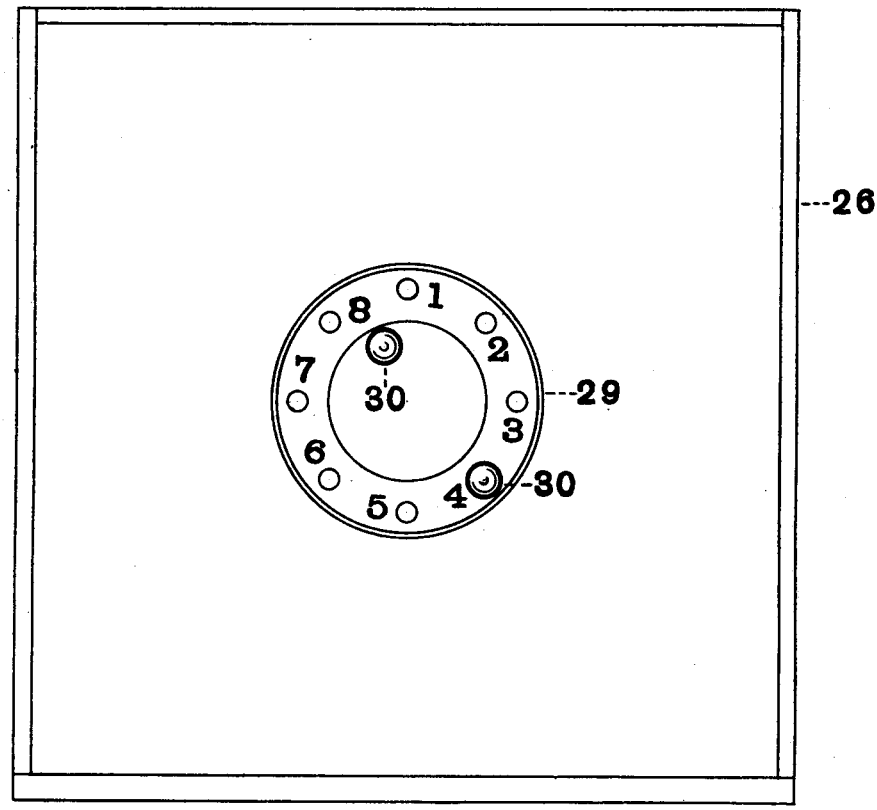

Referring now to the accompanying drawings, in which is illustrated one form of machine embodying my invention, Figure 1 is a top perspective view of the indicator as seen by the customer. Fig. 2 is a vertical section of the entire machine, taken on the line A A in Fig. 1. Fig. 3 is a bottom view of one of the money-boxes. Fig. 4 is a side view of one of the money-boxes. Fig. 5 is a top view of the ratchet-wheel, the dogs, the money-box trip, the bearing, and a part of the case. Fig. 6 is a top view of the cash-deposit drawer, into which the money is deposited, and a top view of the indicator for detecting the clerk who attempts to beat the machine.

Similar numerals refer to similar parts throughout the several views.

As shown in the drawings, I preferably inclose the working parts in a case, (indicated by 1,) showing the square part of the case in which the cash-deposit and cash-drawer is located and a round top 2 on same, in which is located the rotary frame 22, having therein the money-boxes, (indicated by 4, 5, 6, and 7,) covered by the top cap 8, under which is the rotary frame 22, having the money-boxes 4, 5, 6, and 7 and the handles 3 secured thereto, by which it is rotated at will in one direction only.

Over the money-boxes 5, 6, and 7 glass is placed in the top cap 8, as shown in Fig. 2, the glass being left out over box 4, so the money can be placed therein.

To the bottom of the money-boxes 4, 5, 6, and 7 is hinged the bottom 9, as shown in Fig. 3, the hook 11 being secured to the box and the latch 12 held to the bottom 9 by the slide-bearings 13 and pushed into the hook 11 by the spring 15, bearing against the slide 13 at one end and the pin 14 at the other end. The latch 12 is withdrawn by being riveted to the lever 10, which is riveted to the bottom 9 by the rivet 16, and the lever 10 slides into the holder 17, thus drawing the latch 12 out of the hook 11, when the link 18 is drawn backward by the trip-lever 19, which is tripped by striking the hook 20, which remains rigid, being secured to the rigid ratchet-wheel 23, as shown in Fig. 2. The bottom 9 of the money-box is returned and locked in place by the motion of the spring 21, which is coiled around the hinge-rod and one end bearing on the rear of the money-box, while the other bears on the bottom 9 of the box. When the trip-lever 19 strikes the hook 20, the lever 10 moves back as far as the opening in the slide 17 will permit and unlatches the latch 12, and then the bottom 9 of the money-box is pulled down, thus letting the money out into the deposit box or drawer 26 below.

The top cap 8 is pinned to the shaft 25, and the revolving case 22, in which the money-boxes are located, fits around the projection on the cap 8 and bears on the top of the ratchet-wheel 23, which is also pinned fast to the shaft 25. The dogs 31 are secured to the projections on the revolving case 22 and fit in the ratchet-wheel 23, thus allowing the case bearing the money-boxes 4, 5, 6, and 7 to rotate in one direction, but not in the other. To the bottom of the ratchet-wheel 23 is secured the lever or hook 20, and to said hook is secured a bell 28, which is struck and sounded by the trip-lever 19 as it passes under the point of said hook 20.

Below the ratchet-wheel 23 the shaft 25 is secured to the bearing 24, which in turn is secured to the case 2, thus forming a rigid support and bearing for the case 22 to revolve on. As the bearing 24 only occupies a small space and the bottom of the money-boxes is only tripped at one point, it does not interfere with the tripping of said money-boxes. Below the bearing 24 and around casing 2 the case 1 is made square to accommodate the cash-deposit drawer 26, in the center of which is secured the casing 29 for the purpose of holding the balls 30, and in the bottom of the casing 29 are bored small holes to form a slight resting-place for the balls, and the said holes are numbered, so the proprietor may place a ball or number of balls on said numbered holes and then close and lock the drawer, and should the clerk attempt to beat the register or misuse it in any way the balls will be rolled out of the numbered holes, where they were placed by the proprietor, and the clerk not being able to get at the balls and not knowing their former location he cannot replace them, and the fact that they are out of their places shows that the clerk has been trying to get into the proprietor's cash-deposit drawer or beat the machine.

Below the cash-deposit drawer 26 is located a common cash-drawer with the common tills for different denominations of money, and in this drawer 27 is placed the change to be used by the clerk to make change for customers who do not have the correct change to pay for their purchase.

The operation of my invention is as follows: Before beginning business the proprietor places a certain sum, sufficient to make change, within the drawer 27 to be used by the clerk or clerks in making change for customers who make purchases and do not have the correct change. When the purchase is made, the customer or clerk places the correct amount of the purchase in the money-box 4 and the clerk takes hold of the handle 3, four of which are located equal distances apart, and moves it one-quarter of the distance around, or until the box 4 (shown in Fig. 1) is moved to where box 5 now shows in drawing Fig. 1. There it will remain indicated until the second purchase is made, which will be moved same as purchase No. 1, and this move will put purchase No. 1 under the opening where 6 now shows, and when the third purchase is made the first purchase made will be moved to where 7 now shows, and during the travel between where 6 and 7 show the trip-lever 19 strikes the hook 20 and deposits the money in the cash-deposit drawer 26, rings the bell, and returns and locks the bottom in the money-box and shows empty at 7 upon its arrival there.

In making the cap 8 glass is put in all the openings except at 4, where the glass is left out, so the money can be placed in the money-box by the purchaser or clerk, and the bell cannot be rung unless the handle 3 has been moved one-quarter turn, and money-boxes can only be moved in one direction on account of the dogs secured thereto engaging in the rigid ratchet-wheel 23. Should the proprietor wish to show the kind of goods sold, to whom sold, the amount of each separate sale, and by whom sold, the sale is placed in a plain small envelop, on which is written on one side the amount of the sale and on the other side the kind of goods sold, the time sold, to whom and by whom sold, or any other detail, and the envelops sealed and placed in the money-box with the side on which the amount is marked up, so that it can be seen through the glass. The cash-deposit drawer is locked with a combination-lock or special lock to which no one but the proprietor has access.

As indicated, the machine may be built in various ways to suit the requirements of various businesses.

It is obvious that my invention admits of numerous modifications in construction, which modifications would at once appear to one skilled in the art, and I therefore do not confine my invention to the specific construction shown and described.

Having thus described my invention, I claim as new and desire to secure by Letters Patent—

1. In a cash indicator and depositor, the combination with a movable box, of a casing inclosing said box, said casing provided with an opening therein through which money or other suitable matter can be passed to the box, said casing also provided with transparent top portions located away from the opening and inaccessible therethrough, said movable box adapted to pass under said transparent portion to display the contents of the box, an inaccessible receptacle adapted to receive the contents of the movable box after it has been displayed, the bottom of said box provided with positively-operated mechanically-operated means which when actuated permit the bottom to open and deposit the contents of the box in said inaccessible receptacle.

2. In a cash indicator and depositor, the combination with an inclosing case having an opening through which the money can be passed and arranged for the display of the money at another portion of its surface, of a movable box within the case which is adapted to receive the money through the opening and afterward to display it through the case, locking mechanism on the movable bottom of said box and means for automatically operating said locking mechanism at a predetermined point to deposit the money from the box in an inaccessible position after the display thereof.

3. In a cash indicator and depositor, the combination of a transparent case having an opening through which money can be passed, of rotary boxes within the case which are arranged to receive the money in succession through the opening and afterward to display it through the transparent case, locking mechanism on the movable bottom of said box and means for operating said locking mechanism to deposit the money from the boxes after display, in an inaccessible position.

4. In a cash indicator and depositor, the combination with an inclosing case, of movable boxes within the case arranged to receive money and adapted to display the money to view until a predetermined number of sales have been received, spring-actuated locking mechanism on the movable bottoms of said boxes, an inaccessible or secured cash-drawer, and means for operating said locking mechanism to cause the automatic delivery of the contents of the boxes into said drawer after display.

5. In a cash indicator and depositor, the combination with an inclosing case, of a rotatable box having a hinged bottom, said bottom provided with locking mechanism therefor, of levers operatively connected to said locking means and a rigid arm adapted to temporarily engage one of said levers at a certain predetermined point in the circuit of the box, whereby the lever will actuate mechanism to unlock the bottom and will then operate to open the bottom on its hinge.

6. In a cash indicator and depositor, the combination with a plurality of movable boxes, hinged bottoms on said boxes and locking means located on said bottoms, of an inaccessible receptacle and mechanism for operating said locking means to cause the deposit of the contents of the boxes into the inaccessible receptacle.

7. In a cash indicator and depositor, the combination with a transparent case provided with an opening through which money may be passed, of movable receptacles located within the case, the receptacles so arranged as to receive in succession the money from the opening in the case, a normally stationary receptacle adapted to receive the contents of the movable receptacle one at a time, and an indicator comprising a displaceable ball, a series of locations, the locations provided with suitable indicia in one of which the ball is placed and from which it is moved if the receptacle be tampered with.

8. In a cash indicator and depositor, the combination with a case having a money-receiving opening and a transparent portion of movable receptacles within the case which are adapted to receive their contents from the opening aforesaid and to display the same while in transit until a predetermined number of amounts have been received, locking means on said movable receptacles, an inaccessible money-drawer, and mechanism operating said locking means to cause the receptacles to deposit their contents into the said drawer, one after another, an indicator for said drawer to disclose the fact that it has been opened, and an independent cash-drawer for holding change.

9. In a cash indicator and depositor the combination of a partially-transparent case having an opening therein through which money may be passed into movable boxes thereunder, said boxes being open at both ends and having a spring-locked bottom hinged at one side and a trip-lever attached thereto adapted to strike a rigid hook when said boxes are moved to a certain place, and automatically unlock and open said hinged bottom and at the same time ring a bell, when said hinged bottom has been opened far enough to drop the contents of said boxes, substantially as described.

10. In a cash indicator and depositor, the combination of a number of rotating boxes, said boxes being open at one end, automatically spring-locked bottoms closing the opposite ends, a lever on said bottom provided with a trip, a rigid projection adapted to engage said trip at a predetermined point to unlock and open said bottom, a bell rung by said trip, said bottoms provided with springs adapted to close them after the contents of the boxes have been deposited.

11. A cash indicator and depositor provided with a plurality of rotatable receptacles and a drawer for the reception of the contents of the receptacles, the whole surrounded by a casing, said casing having transparent material inserted at intervals therein for inspecting the contents of the receptacles, of a lever-operating mechanism for automatically opening the bottoms of said receptacles and means for automatically closing the same.

12. In a cash indicator and depositor, the combination with a plurality of rotatable boxes, a drawer for receiving the contents of said boxes and a cash drawer or till, the whole surrounded by a casing, said boxes pivoted to revolve around the center of the casing an annular slot in the side of said casing, handles projecting through said slot and connected to the boxes whereby they may be rotated, means for automatically opening the bottoms of said boxes at a predetermined point in the orbits and means for automatically closing the same.

13. In a cash indicator and depositor of the character described, a casing provided with transparent material at intervals in its top, boxes pivoted at and rotatable around the center of said casing, said boxes having hinged bottoms and open at their tops, spring locking means attached to said bottoms, a fixed trip projecting into the orbit of said boxes whereby to open said bottoms when said boxes come in contact with said trip and means for automatically closing said bottoms.

14. In a cash indicator and depositor, the combination with a stem or central pivot, of a frame having a plurality of boxes rotatable around said stem, a ratchet-wheel rigidly secured to said stem and pivoted dogs attached to the frame and engaging the teeth on the ratchet-wheel, said boxes open at the top and provided with spring-hinged bottoms, spring locking means adapted to retain said bottoms in a closed position with relation to the boxes, levers attached to said locking means, a trip rigidly secured at a certain predetermined point in the circuit of said boxes, whereby to engage the levers and open the boxes as they pass, a bell which is rung by said levers and a drawer to receive the contents of the boxes, the whole surrounded and inclosed within a casing secured to the stem.

15. In a cash indicator and depositor, the combination with a central stem to which a casing is rigidly secured, of a frame within said casing, said frame provided with a plurality of boxes and revolubly fitted on said stem, said boxes having handles attached thereto, an annular slot in said casing through which the handles project, a ratchet-wheel rigidly secured to said stem, pivoted dogs on said frame engaging the teeth of the ratchet-wheel and permitting the frame to be revolved in but one direction, spring-closed bottoms on said boxes, automatic locking means for said bottoms, levers connected with said locking means, a trip rigidly attached at a predetermined point in the circuit of said boxes whereby to operate the levers and open the bottoms against the tension of the springs, a bell which is rung by said levers during the opening of said bottoms, a drawer for receiving the contents of the boxes, said drawer being located beneath the same and provided with a means for detecting attempts to defraud the cash indicator and depositor.

16. In a cash indicator or depositor, the combination with a cash-drawer, of a movable cash-receptacle having a spring-closed trap-bottom, mechanism for positively locking or latching said bottom, and means for automatically unlocking or unlatching said bottom when the receptacle is in position to discharge its contents into the drawer.

17. In a cash indicator or depositor, the combination with a cash-drawer, of a movable cash-receptacle having a spring-closed trap-bottom, automatically-acting mechanism for positively locking or latching said bottom, when free, and means adapted to automatically unlock or unlatch said bottom when the receptacle is in position to discharge its contents into the drawer, said locking mechanism automatically closing the bottom when the receptacle is returned to receiving position.

18. In an indicator and depositor, the combination with a normally inaccessible cash-receptacle, of an indicator likewise normally inaccessible, the indicator located contiguous to the cash-receptacle, comprising a movable object, and a plurality of indicated and predetermined locations at which the movable object is adapted to be placed and from which it is displaced whereby to disclose any attempt to defraud the machine.

19. In a cash indicator and depositor, the combination with a cash-receptacle, of an indicator, comprising a displaceable movable object and a plurality of indicated locations in which the object is adapted to be placed and from which it is displaced when the deposit-drawer is disturbed.

20. In a cash indicator or depositor, the combination with a cash-receptacle having holders provided with indicia, of displaceable objects adapted to be seated in said holders and which are displaced when the receptacle is disturbed.

21. In a cash indicator or depositor, the combination with a cash-receptacle, of an indicator comprising pockets, said pockets provided with indicia, and balls seated in said pockets, which balls are displaced when the cash-receptacle is tampered with.

22. In a cash indicator or depositor, the combination with a rotatable box having a hinged bottom, said bottom provided with locking means therefor, of levers operatively connected to said locking means, and a rigid arm adapted to engage one of said levers whereby to unlock the box-bottom, a further movement operating to open it upon its hinge, and a spring for closing said bottom, against the tension of which spring the bottom is opened.

23. In a cash indicator or depositor, the combination with a cash-receptacle and a plurality of rotatable money-receiving boxes, a casing surrounding said rotatable boxes and having a slot, of a handle secured to the boxes and movable in said slot, whereby the boxes may be rotated, and mechanical means secured on said boxes independent of said handle whereby to automatically and positively open and close said boxes to deposit the contents thereof in the receptacle and adapt the boxes to receive another deposit.

24. In a cash register or depositor, the combination with a cash-receptacle having pockets provided with indicia, of balls seated in said pockets and which are displaced when the receptacle is disturbed.

25. A cash indicator or depositor provided with a plurality of rotatable boxes and a receptacle for receiving the contents of said boxes, the whole inclosed within a casing, and an independent lever mechanism for automatically opening the bottoms of said boxes and means for automatically closing said bottoms.

26. A cash indicator or depositor provided with a plurality of rotatable boxes and a receptacle for receiving the contents of said boxes, the whole inclosed within a casing, and an independent lever mechanism located on each of said boxes which, when actuated, automatically opens the bottoms of said boxes and independent means for automatically closing said bottoms.

27. In a cash indicator or depositor, the combination with a normally stationary receptacle, of a movable box provided with a bottom capable of opening and closing, said bottom having independent means for effecting the closing thereof, means for positively locking or latching said bottom and means for automatically unlocking or unlatching said bottom when the box is in position to discharge its contents into the stationary receptacle.

28. In a cash indicator and depositor, the combination with a normally stationary receptacle, of an indicator comprising a surface having indicia located thereon, and a movable object adapted to be arranged in a predetermined position with reference to said indicia, the movable object being displaced to disclose any attempt to defraud the machine.

29. In a cash indicator and depositor, the combination with a cash-receptacle, of an indicator secured thereto, the indicator comprising a displaceable object and a plurality of indicated locations in any of which the object is adapted to be placed and from which it is displaced when the cash-drawer is tampered with.

30. In a cash indicator and depositor, the combination with a normally stationary cash-receptacle, of an indicator secured thereto, the indicator comprising a movable object and a plurality of indicated locations in which the object is adapted to be placed and from which it is displaced when the cash-drawer is tampered with.

31. In a cash indicator and depositor, the combination with a cash-receptacle, of an indicating device secured thereto, the device consisting of a movable object and a plurality of indicated locations in one of which the object is adapted to be placed and from which it is displaced when the cash-drawer is tampered with.

32. In a cash indicator and depositor, the combination of a number of rotating boxes, the boxes being open at one end, automatically-locked bottoms removably closing the opposite ends, a lever on the bottom provided with a trip, a rigid projection adapted to engage the trip at a predetermined point to unlock and open the bottom, the bottom adapted to automatically close after the contents of the boxes have been discharged.

In testimony whereof I have hereunto set my hand this 22d day of May, A. D. 1900.

JACOB H. SNOW.

In presence of—
  C. E. JOHNSON,
  JESSE D. HOMRICK.